United States Patent
Belloni

(10) Patent No.: US 12,373,178 B2
(45) Date of Patent: Jul. 29, 2025

(54) DETERMINING DEPENDENCIES IN WORKSPACES

(71) Applicant: JPMorgan Chase Bank, N.A., New York, NY (US)

(72) Inventor: Cristiano Belloni, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 279 days.

(21) Appl. No.: 18/099,221

(22) Filed: Jan. 19, 2023

(65) Prior Publication Data

US 2024/0248689 A1 Jul. 25, 2024

(51) Int. Cl.
*G06F 8/41* (2018.01)
*G06F 8/30* (2018.01)
*G06F 8/74* (2018.01)

(52) U.S. Cl.
CPC .............. *G06F 8/427* (2013.01); *G06F 8/31* (2013.01); *G06F 8/74* (2013.01)

(58) Field of Classification Search
CPC ... G06F 8/427; G06F 8/31; G06F 8/74; G06F 8/437; G06F 8/60; G06F 9/45512; G06F 8/73
See application file for complete search history.

(56) References Cited

U.S. PATENT DOCUMENTS

| | | | |
|---|---|---|---|
| 10,394,554 B1 * | 8/2019 | Healey | G06F 8/74 |
| 11,474,796 B1 * | 10/2022 | Mather | G06F 8/77 |
| 2023/0244466 A1 * | 8/2023 | Shah | G06F 9/541 |
| | | | 717/178 |

FOREIGN PATENT DOCUMENTS

| | | | | |
|---|---|---|---|---|
| CN | 114238227 A | * | 3/2022 | |
| WO | WO-2015183241 A1 | * | 12/2015 | G06F 8/41 |

OTHER PUBLICATIONS

Translated CN 114238227 A; 12 pages (Year: 2022).*
Mohammad Sadegh Rasooli; Yara Parser: A Fast and Accurate Dependency Parser; arXiv; 14 pages; retrieved on Apr. 2, 2025. (Year: 2015).*
Nasif Imtiaz; Are Your Dependencies Code Reviewed?: Measuring Code Review Coverage in Dependency Updates; IEEE; pp. 4932-4945; retrieved on Apr. 2, 2025 (Year: 2023).*

* cited by examiner

*Primary Examiner* — S. Sough
*Assistant Examiner* — Cuong V Luu
(74) *Attorney, Agent, or Firm* — Greenblum & Bernstein, P.L.C.

(57) ABSTRACT

Implementations generally relate to dependencies in workspaces. In some implementations, a method includes receiving one or more file types. The file types refer to source code files that contain source code. The method further includes fetching the source code files from a repository. The method further includes parsing the source code files resulting in parsed source code. The method further includes identifying import declarations in the parsed source code and extracting dependency information from the import declarations.

17 Claims, 5 Drawing Sheets

300

DETERMINING DEPENDENCIES IN WORKSPACES

BACKGROUND

In version-control systems, a mono repository is a software-development concept where source code for a number of different projects and workspaces is stored in a single repository. Stated differently, instead of having separate repositories for each workspace, multiple repositories are grouped together within a one repository. Some systems may utilize mono repository tools to create a graph of dependencies within and among workspaces or workspace packages based on dependency declarations in manifest files (e.g., package.json files, etc.). Manifest files might not include all dependencies, such as transitive dependencies, which have an indirect relationship between values in the same table. A workspace package might not require a transitive dependency directly, but it might depend on another package that does directly require a transitive dependency.

DETAILED DESCRIPTION

Figure 1:
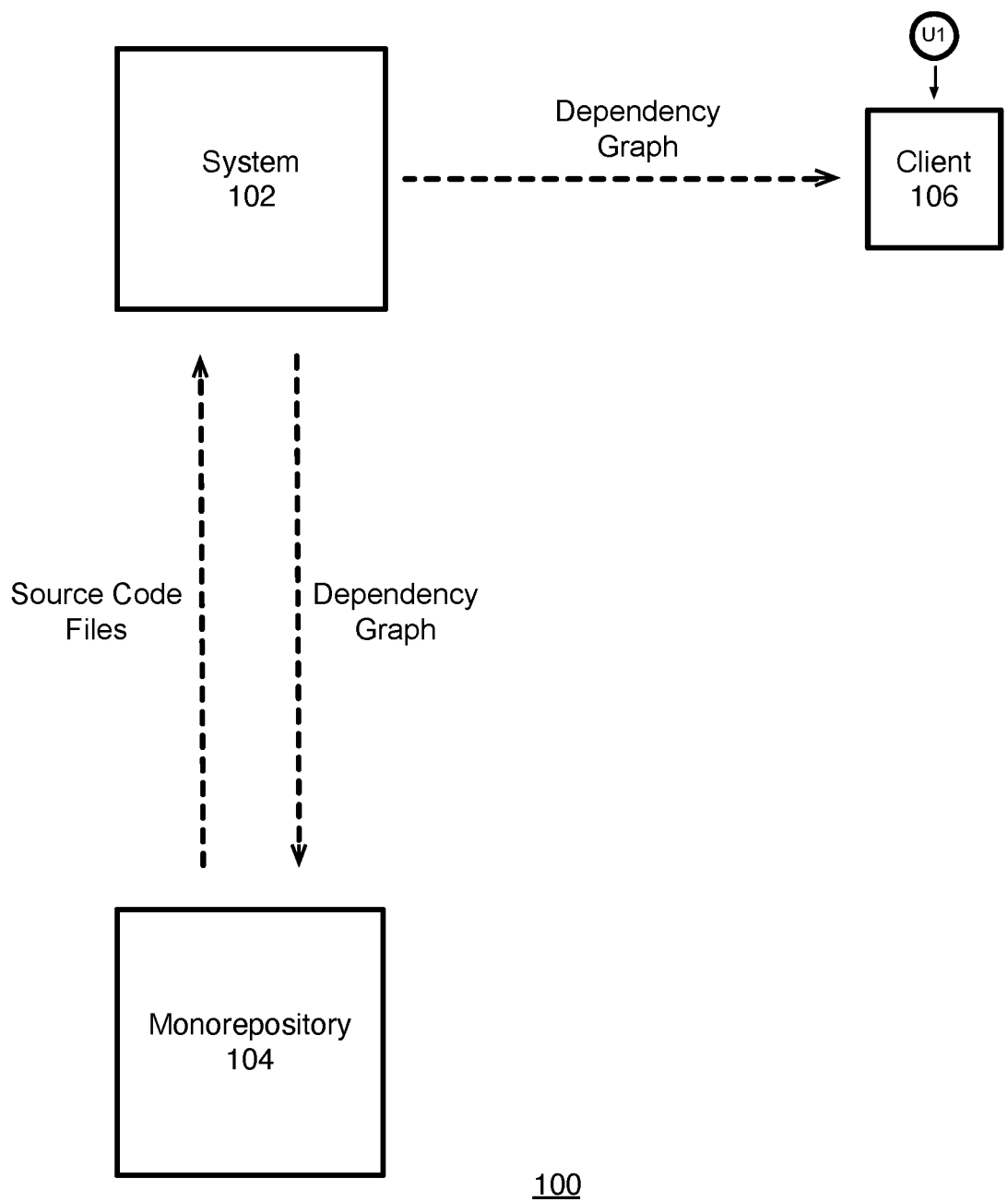
FIG. 1 is a block diagram of an example environment for determining dependencies in workspaces, which may be used for implementations described herein.

Implementations described herein provide functionality or operations used to build, develop, and test web single page applications (SPAs), micro-front-ends, and libraries. These operations range from building a workspace selectively (e.g., only dependent workspaces, ancestor workspaces of a workspace, etc.) to rewriting all dependencies to an external content delivery network (CDN). Implementations enable the authoring of immutable ECMA (European Computer Manufacturers Association) Script modules that can be imported at runtime to implement micro-front-end patterns. ECMAScript modules enable a developer to encapsulate various types of functionalities and to expose such functionalities to other JavaScript files and libraries.

As indicated above, in version-control systems, a mono repository stores source code for a number of different projects and workspaces. A mono repository command line interface (CLI) tool enables users to perform operations on many workspaces inside the single mono repository. Some systems may utilize source mono repository tools to create a graph of dependencies based on dependency declarations in manifest files (e.g., package.json files, etc.). Implementations described herein enable such systems to graph all dependencies among different workspaces or workspace packages in a mono repository, including transitive dependencies.

A manifest file in computing is a file containing metadata for a group of accompanying files that are part of a set or coherent unit. For example, the files of a computer program may have an associated manifest describing the name, version number, license, and the constituent files of the program. Manifest files may also include a list of dependencies of the source code. For example, a manifest file associated with a workspace package A may include a list of dependencies indicating that an input to workspace package A is dependent on data from a workspace package B. However, manifest files are often incomplete, because dependency lists of manifest files often do not include all dependencies, such as transitive dependencies. A workspace may include a package with a dependency without declaring the dependency in a manifest. As such, a dependency list in a manifest may be imperfect due to not declaring all dependencies.

As indicated above, manifests often do not list transitive dependencies, which are dependencies in a database that have an indirect relationship between values in the same table causing a functional dependency. For example, if P is dependent on Q and Q is dependent on R, then P being dependent on R is a transitive dependency. Developers often import transitive dependencies in source code, which can be problematic as transitive dependencies are hidden and may be controlled by third parties.

Because transitive dependencies are not always mentioned in manifest files, functionality is needed that can extract all dependencies from source code, including external and transitive dependencies installed from a registry such as a node package manager (NPM). The functionality should be able to extract workspace dependencies that are declared in the source code. The functionality should be fast, as parsing code is normally a performance-onerous task. The functionality should be able to parse multiple types of code such as JavaScript (JS), Typescript (TS), JavaScript Syntax Extension or JavaScript XML (JSX), a TypeScript file written using JSX syntax (TSX), and cascading style sheets (CSS), etc.

Implementations described herein address these issues and provide various other benefits. For example, in various implementations, a system enables and facilitates the analysis of dependencies in workspaces. Implementations extract imported dependencies from various different types of source code such as JavaScript, TypeScript, CSS source files, etc. In an example implementation, the system uses concurrency and internal application programming interfaces (APIs) associated with a bundler (e.g., JavaScript bundler) for enhanced performance.

As described in more detail herein, in various implementations, a system receives one or more file types, where the file types refer to one or more source code files that contain source code. The system then fetches the one or more source code files from a repository or mono repository. The system then parses the one or more source code files resulting in parsed source code. The system then identifies import declarations in the parsed source code. The system then extracts dependency information from the import declarations.

FIG. 1 is a block diagram of an example environment 100 for determining dependencies in workspaces, which may be used for implementations described herein. As shown, environment 100 includes a system 102, a mono repository 104, a client application 106 or client 106. In various implementations, system 102 outputs dependency information (e.g., dependency graph) to a standard output (e.g., Unix pipes, etc.), which may be received by client 106.

As described in more detail herein, system 102 fetches source code files from mono repository 104 based on a CLI request indicating types of files containing source code.

System 102 recursively analyzes the source code from the different files fetched in order to parse the source code, and identify and extract import declarations. System 102 then determines from the import declarations all dependencies within each workspace package and external to each workspace package, including transitive dependencies. System 102 may apply a complete list of all dependencies in a variety of ways. For example, system 102 may generate a dependency graph of all dependencies in the mono repository. System 102 may send such a dependency graph to a user or another system for use via client 106. System 102 may also save such a dependency graph to mono repository 104 for storage for future analysis and use.

For ease of illustration, FIG. 1 shows one block for each of system 102, mono repository 104, and client 106. Blocks 102, 104, and 106 may each represent multiple respective systems, mono repositories, and clients. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
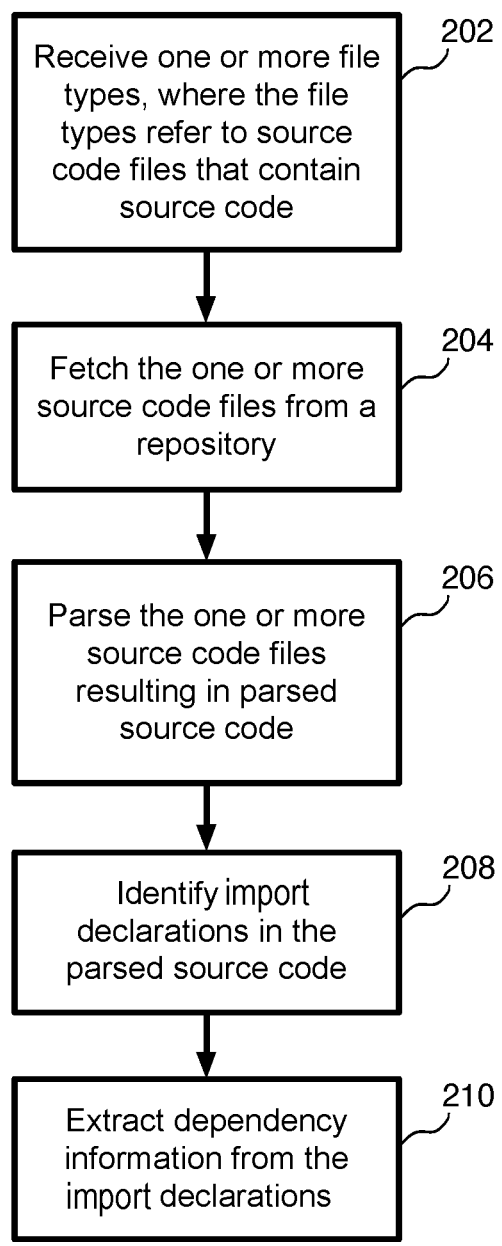
FIG. 2 is an example flow diagram for determining dependencies in workspaces, according to some implementations.

FIG. 2 is an example flow diagram for determining dependencies in workspaces, according to some implementations. Referring to both FIGS. 1 and 2, a method is initiated at block 202, where a system such as system 102 receives one or more file types. In various implementations, the file types refer to source code files that contain source code.

In various implementations, the system provides a CLI for inputting the one or more file types. In various implementations, the system may search for source code contained in all of the file types listed in the CLI. The system may also exclude from the search files of file types that are not listed in the CLI. The system may search all subdirectories of different packages recursively for any files with listed extensions. In some implementations, the system may provide a NodeJS wrapper around the command-line tool, which automatically installs the appropriate compiled version for a user's platform, and automatically spawns the command in the CLI in a subprocess, capturing and parsing its output (e.g., source code, etc.).

In various implementations, the source code files may include one or more of JS, TS, JSX, TSX and CSS. As indicated above, the system searches all files in the mono repository extensions indicating the target file types.

At block 204, the system fetches the one or more source code files from a repository. In various implementations, the repository is a mono repository. The system fetches source code files associated with all workspace packages of the mono repository.

At block 206, the system parses the one or more source code files resulting in parsed source code. Parsing the source code enables the system to analyze source code for target code (e.g., import declarations, etc.). In various implementations, the system may utilize the internal API of a fast JavaScript bundler to parse the source files, as well as to perform other steps described herein.

At block 208, the system identifies import declarations in the parsed source code. The system parses source code import declarations in order to identify the different dependencies, including transitive dependencies. The system analyzes the import declarations in the source code in order to identify the dependencies. In various implementations, import declarations include names of dependencies. In some implementations, for example, when the information of the dependency graph is used to rewrite all the import declarations to a Content Delivery Network system, the system may ignore duplicate dependencies in order to identify unique dependencies used to prepare a map of unique import targets to use when rewriting the code.

In some implementations, the system may use the JavaScript bundler to identify the import declarations for analysis. The system may obtain a JavaScript object notation (JSON) object with the dependencies, a file count, a number of files parsed, errors, etc. The dependencies may be in the form of an import array, which gives a list of all of the unique dependencies extracted from the directories of the mono repository.

At block 210, the system extracts dependency information from the import declarations. In various implementations, the system generates and outputs a JSON structure with a flat list of dependencies extracted from the fetched source code files. Further example implementations are described in more detail below. The system may be applied to the whole mono repository to get a list of all the dependencies in the code. The system may also be applied separately to single packages of even single files, repeatedly, to generate a detailed graph of interdependencies in the mono repository, depending on the level of flexibility needed.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

As indicated above, in various implementations, the system generates a list of dependencies, wherein the list of dependencies is based on the dependencies that the system extracted from the source code. The system then stores the list of dependencies in a datastore. In some implementations, the system stores the list of dependencies in a JSON data structure.

As indicated herein, the list of dependencies includes transitive dependencies, which is a valuable benefit. By identifying dependencies directly from the source code as opposed to relying on manifest files, the system is able to reliably call out transitive dependencies. This enables or facilitates developers in addressing transitive dependencies. For example, by being aware of all transitive dependencies from the system's output (e.g., dependency graph, etc.), developers can rewrite source code to eliminate transitive dependencies, warn users about them, or generate a more precise import map that effectively lists all the dependencies, even the ones "hidden" by the use of transitive dependencies. In other words, in various implementations, the system may facilitate in eliminating or working around transitive dependencies by the system parsing the one or more source files and identifying the import declarations in the parsed source code. Also, manifest files are optional and can be helpful or not. Rather than relying on a manifest file for determining dependencies, the system determines dependencies directly from source code, which is significantly more reliable. This enables a developer to perform operations based on the full set of dependencies rather than the incomplete information provided by manifest files.

The extracted dependencies have various applications. For example, in various implementations, the system generates a dependency graph based on the list of dependencies. The system may use or may enable another system to use the list of dependencies to facilitate a developer in writing user interface (UI) applications in a browser, including libraries. The system may enable a developer to revise dependencies, which may be made available in external libraries that users use in their browser applications. For example, if a package is to be renamed but is relied on for dependencies, the dependency graph enables a user to rename all the dependencies that depend on the renamed package.

As indicated above, the system may enable a developer to rewrite dependencies to eliminate transitive dependencies. The dependency information also may be used to selectively execute operations on a subset of workspaces at scale, according to dependency criteria. For example, the information contained in the dependency information may be used to perform operations on a set of workspaces in the mono repository and all the workspaces that depend on it or are depended on by it (descendants and ancestors). This can be used, for example, to optimize the build of a set of workspaces and all their dependencies in the correct build order, parallelizing the operation for workspaces that are not mutually interdependent. The dependency information might be also used to rewrite all the external dependencies in a code base to use a content delivery network that provides dependencies at run-time, enabling applications to efficiently share common dependencies when executed in the same browser page (e.g., using the native ECMAScript Modules format present in all modern browsers). This greatly improves build times and composability of applications, allowing teams to independently build and publish their applications, composing them at run-time (instead of build-time).

In various implementations, the dependency information enables selective building of workspace packages and selective testing (e.g., test only what has changed). For example, the dependency graph enables a developer to test all of the source code dependent on or depended on by selected source code. The information may also be used for statistical analysis, as well as for security filtering.

Figure 3:
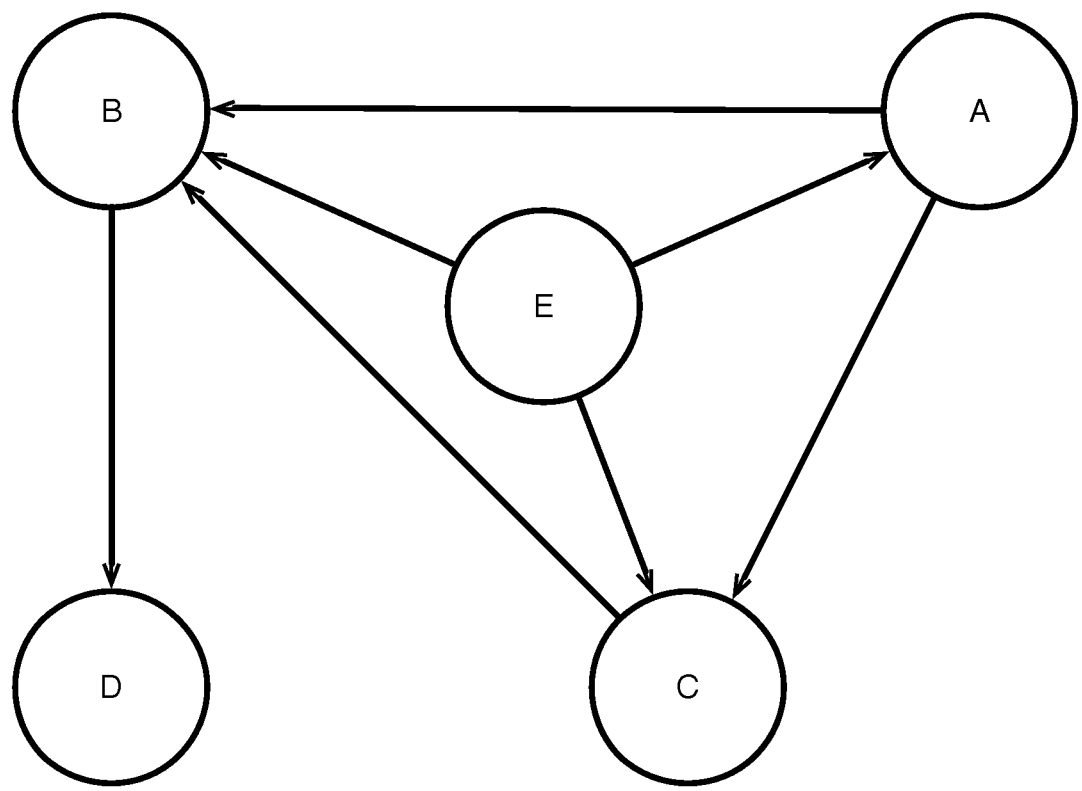
FIG. 3 is an example dependency graph for determining dependencies in workspaces, according to some implementations.

FIG. 3 is an example dependency graph 300 for determining dependencies in workspaces, according to some implementations. Once all of the dependencies are extracted from the source files, the system may then put the dependencies in a graph form to construct a dependency graph based on the dependencies.

In various implementations, the dependency graph links dependencies for analysis or for another system to analyze. The dependency graph also makes dependencies visual for a user. For example, as shown in FIG. 3, Workspace A has dependencies on Workspace B and Workspace C. Workspace B has dependencies on Workspace D. Workspace C has dependencies on Workspace B. Workspace D has no defined dependencies. Workspace E has dependencies on Workspace A, Workspace B, and Workspace C.

In some scenarios, the system may build one dependency graph per workspace package. Because the system ultimately determines all of the dependencies for a given package, the system may match the dependencies of all of the dependency graphs and then construct a dependency graph for all packages in a mono repository.

Implementations described herein provide various benefits. For example, implementations use a bundler in a concurrent way for parsing and to extract dependencies from a project precisely and comprehensively. Implementations may also enable dependency analysis on JS, TS, JSX, TSX and CSS source code against a database of vulnerability or against blacklisted dependencies.

Figure 4:
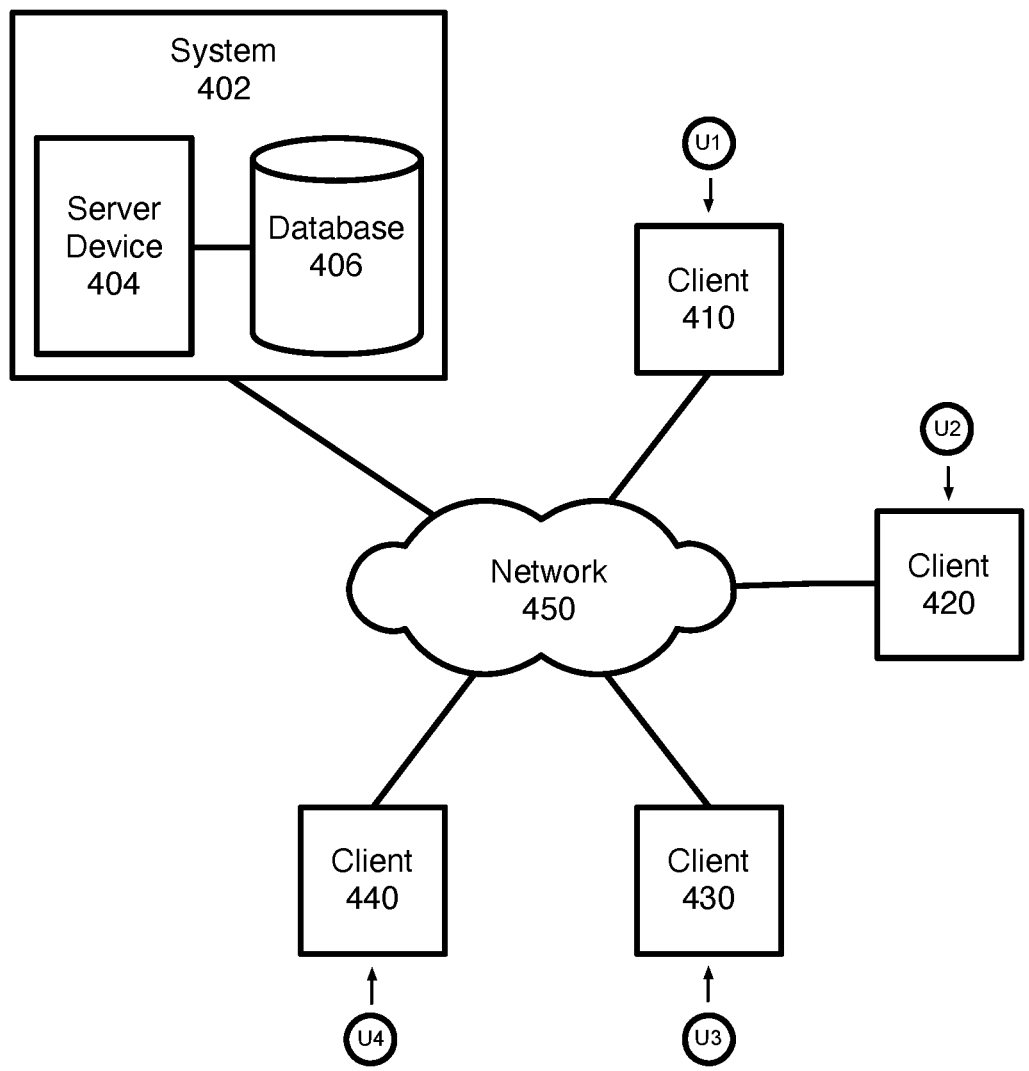
FIG. 4 is a block diagram of an example network environment, which may be used for some implementations described herein.

FIG. 4 is a block diagram of an example network environment 400, which may be used for some implementations described herein. In some implementations, network environment 400 includes a system 402, which includes a server device 404 and a database 406. For example, system 402 may be used to implement system 102 of FIG. 1, as well as to perform implementations described herein. Network environment 400 also includes client devices 410, 420, 430, and 440, which may communicate with system 402 and/or may communicate with each other directly or via system 402. Network environment 400 also includes a network 450 through which system 402 and client devices 410, 420, 430, and 440 communicate. Network 450 may be any suitable communication network such as a Wi-Fi network, Bluetooth network, the Internet, etc.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server device 404 of system 402 performs implementations described herein, in other implementations, any suitable component or combination of components associated with system 402 or any suitable processor or processors associated with system 402 may facilitate performing the implementations described herein.

In the various implementations described herein, a processor of system 402 and/or a processor of any client device 410, 420, 430, and 440 cause the elements described herein (e.g., information, etc.) to be displayed in a user interface on one or more display screens.

Figure 5:
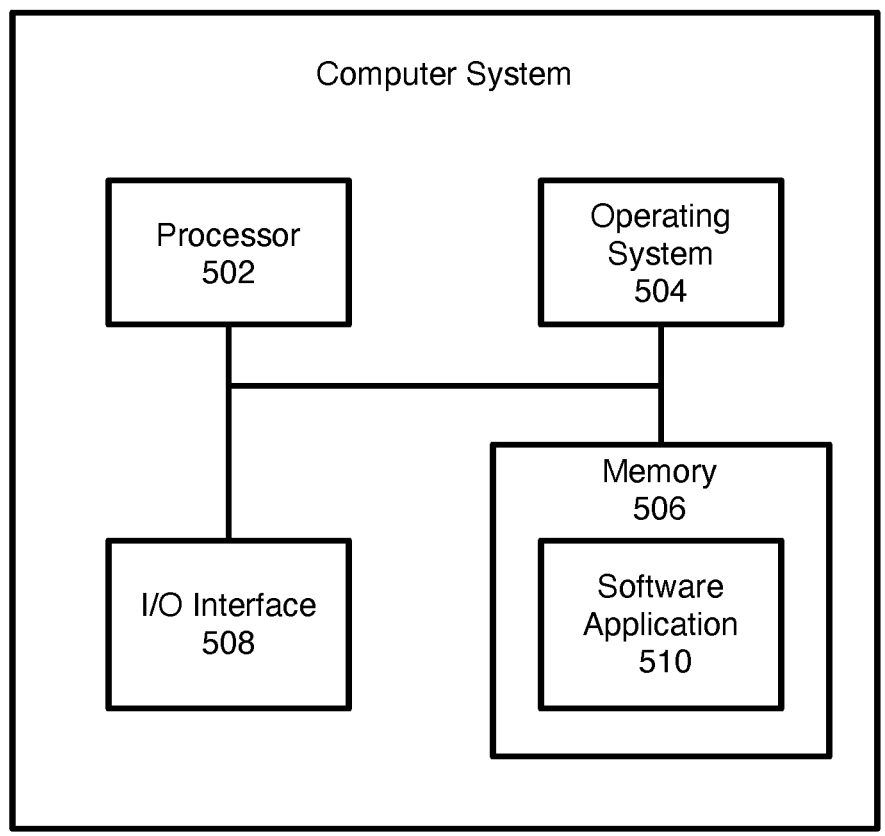
FIG. 5 is a block diagram of an example computer system, which may be used for implementations described herein.

FIG. 5 is a block diagram of an example computer system 500, which may be used for some implementations described herein. For example, computer system 500 may be used to implement server device 404 of FIG. 4 and/or system 102 of FIG. 1, as well as to perform implementations described herein. In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Computer system 500 also includes a software application 510, which may be stored on memory 506 or on any other suitable storage location or computer-readable medium. Software application 510 provides instructions that enable processor 502 to perform the implementations described herein and other functions. Software application 510 may also include an engine such as a network engine for performing various functions associated with one or more networks and network communications. The components of computer system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including Go, C, C++, C #, Java, JavaScript, assembly language, etc. Different programming techniques can be employed such as procedural or object-oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general-purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   one or more non-transitory computer-readable storage media storing logic for execution by the one or more processors to perform operations comprising:
   receiving one or more file types, wherein the one or more file types refer to one or more source code files, wherein the one or more source code files contain source code;
   fetching the one or more source code files from a repository;
   parsing the one or more source code files by running concurrent operations of an internal application programming interface (API) of a bundler resulting in parsed source code;
   identifying, via the bundler, import declarations in the parsed source code, wherein the identifying of the import declarations includes obtaining a JavaScript object notation (JSON) object that includes dependency information, a file count, a number of files parsed, and errors contained within the one or more source code files;
   extracting the dependency information from the import declarations including the JSON object, wherein the extracting operation runs concurrent operations of the internal API, and wherein the dependency information includes a list of inputs into one of the one or more source code files that depend from data in the same source code file or a different source code file;

identifying at least one dependency from the dependency information, wherein the identifying of each dependency includes identifying a corresponding dependency type including transitive, functional, and external dependencies for the each dependency;

generating a list of dependencies from the dependency information;

removing duplicate dependencies form the list of dependencies;

storing the list of dependencies in a datastore; and outputting a JSON structure that includes the list of dependencies.

2. The system of claim 1, wherein the logic when executed is further operable to cause the one or more processors to perform operations comprising:

providing a command-line interface for inputting the one or more file types;

searching the one or more file types for the one or more source code files; and automatically generating, via a wrapper software module, a command in the command-line interface for the parsing of the one or more source code files.

3. The system of claim 1, wherein the one or more source code files comprise one or more of JavaScript, TypeScript, JavaScript syntax extension, TypeScript written using JavaScript syntax extension syntax, and cascading style sheets; and the one or more processors further perform the receiving operation, the fetching operation, the parsing operation, the identifying of import declarations, the extracting operation, and the identifying of at least one dependency using Go, C, C++, C#, Java, JavaScript, or an assembly language.

4. The system of claim 1, wherein the repository is a mono repository, and wherein the logic when executed is further operable to cause the one or more processors to correct a build order for publishing an application, based on the dependency information, by rewriting dependencies in workspaces in the mono repository, rewriting dependencies in workspaces that depend on the mono repository, and rewriting dependencies in workspaces that are depended on by the mono repository.

5. The system of claim 1, wherein the parsing of the one or more source code files and the identifying of the import declarations in the parsed source code eliminate transitive dependencies.

6. The system of claim 1, wherein the logic when executed is further operable to cause the one or more processors to perform operations comprising:

generating a dependency graph based on the list of dependencies; and rewriting the import declarations, based on the dependency graph, to a content delivery network.

7. A non-transitory computer-readable storage medium with program instructions stored thereon, the program instructions when executed by one or more processors are operable to cause the one or more processors to perform operations comprising:

receiving one or more file types, wherein the one or more file types refer to one or more source code files, wherein the one or more source code files contain source code;

fetching one or more source code files from a repository;

parsing the one or more source code files by running concurrent operations of an internal application programming interface (API) of a bundler resulting in parsed source code;

identifying, via the bundler, import declarations in the parsed source code, wherein the identifying of the import declarations includes obtaining a JavaScript object notation (JSON) object that includes dependency information, a file count, a number of files parsed, and errors contained within the one or more source code files;

extracting the dependency information from the import declarations including the JSON object, wherein the extracting operation runs concurrent operations of the internal API, and wherein the dependency information includes a list of inputs into one of the one or more source code files that depend from data in the same source code file or a different source code file;

identifying at least one dependency from the dependency information, wherein the identifying of each dependency includes identifying a corresponding dependency type including transitive, functional, and external dependencies for the each dependency;

generating a list of dependencies from the dependency information;

removing duplicate dependencies form the list of dependencies;

storing the list of dependencies in a datastore; and outputting a JSON structure that includes the list of dependencies.

8. The computer-readable storage medium of claim 7, wherein the instructions when executed are further operable to cause the one or more processors to:

provide a command-line interface for inputting the one or more file types;

search the one or more file types for the one or more source code files; and automatically generate, via a wrapper software module, a command in the command-line interface for the parsing of the one or more source code files.

9. The computer-readable storage medium of claim 7, wherein the one or more source code files comprise one or more of JavaScript, TypeScript, JavaScript syntax extension, TypeScript written using JavaScript syntax extension syntax, and cascading style sheet; and the one or more processors further perform the receiving operation, the fetching operation, the parsing operation, the identifying of import declarations, the extracting operation, and the identifying of at least one dependency using Go, C, C++, C#, Java, JavaScript, or an assembly language.

10. The computer-readable storage medium of claim 7, wherein the repository is a mono repository, and wherein the instructions when executed are further operable to cause the one or more processors to correct a build order for publishing an application, based on the dependency information, by rewriting dependencies in workspaces in the mono repository, rewriting dependencies in workspaces that depend on the mono repository, and rewriting dependencies in workspaces that are depended on by the mono repository.

11. The computer-readable storage medium of claim 7, wherein the parsing of the one or more source code files and the identifying of the import declarations in the parsed source code eliminate transitive dependencies.

12. The computer-readable storage medium of claim 7, wherein the instructions when executed are further operable to cause the one or more processors to perform operations comprising:

generating a dependency graph based on the list of dependencies; and rewriting the import declarations, based on the dependency graph, to a content delivery network.

13. A computer-implemented method comprising:

receiving one or more file types, wherein the one or more file types refer to one or more source code files, wherein the one or more source code files contain source code;

fetching the one or more source code files from a repository;

parsing the one or more source code files by running concurrent operations of an internal application programming interface (API) of a bundler resulting in parsed source code;

identifying, via the bundler, import declarations in the parsed source code, wherein the identifying of the import declarations includes obtaining a JavaScript object notation (JSON) object that includes dependency information, a file count, a number of files parsed, and errors contained within the one or more source code files;

extracting the dependency information from the import declarations including the JSON object, wherein the extracting operation runs concurrent operations of the internal API, and wherein the dependency information includes a list of inputs into one of the one or more source code files that depend from data in the same source code file or a different source code file;

identifying at least one dependency from the dependency information, wherein the identifying of each dependency includes identifying a corresponding dependency type including transitive, functional, and external dependencies for the each dependency;

generating a list of dependencies from the dependency information;

removing duplicate dependencies form the list of dependencies;

storing the list of dependencies in a datastore; and outputting a JSON structure that includes the list of dependencies.

14. The method of claim 13, further comprising:

providing a command-line interface for inputting the one or more file types;

searching the one or more file types for the one or more source code files; and automatically generating, via a wrapper software module, a command in the command-line interface for the parsing of the one or more source code files.

15. The method of claim 13, wherein the one or more source code files comprise one or more of JavaScript, TypeScript, JavaScript syntax extension, TypeScript written using JavaScript syntax extension syntax, and cascading style sheets; and the method further comprises implementing the receiving operation, the fetching operation, the parsing operation, the identifying of import declarations, the extracting operation, and the identifying of at least one dependency using Go, C, C++, C#, Java, JavaScript, or an assembly language.

16. The method of claim 13, wherein the repository is a mono repository; and the method further comprises correcting a build order for publishing an application, based on the dependency information, by rewriting dependencies in workspaces in the mono repository, rewriting dependencies in workspaces that depend on the mono repository, and rewriting dependencies in workspaces that are depended on by the mono repository.

17. The method of claim 13, wherein the parsing of the one or more source code files and the identifying of the import declarations in the parsed source code eliminate transitive dependencies.

* * * * *